United States Patent
Mays, Jr. et al.

(10) Patent No.: US 7,630,609 B1
(45) Date of Patent: Dec. 8, 2009

(54) ARRAYED MULTI-FIBER CONNECTOR

(75) Inventors: Robert Mays, Jr., Duncanville, TX (US); John M. Culbert, Round Rock, TX (US)

(73) Assignee: Megladon Manufacturing Group, Ltd., Austin, TX (US)

( * ) Notice: Subject to any disclaimer, the term of this patent is extended or adjusted under 35 U.S.C. 154(b) by 0 days.

(21) Appl. No.: 11/176,493

(22) Filed: Jul. 7, 2005

(51) Int. Cl.
*G02B 6/00* (2006.01)

(52) U.S. Cl. ...................................................... 385/137

(58) Field of Classification Search .................. 385/33, 385/137, 50, 52, 65, 83; 65/387
See application file for complete search history.

(56) References Cited

U.S. PATENT DOCUMENTS

| | | | |
|---|---|---|---|
| 3,871,935 A | 3/1975 | Murry | |
| 4,029,390 A | 6/1977 | Chinnock et al. | |
| 4,991,922 A | 2/1991 | Dahlgren | |
| 5,566,262 A | 10/1996 | Yamane et al. | |
| 5,604,635 A | 2/1997 | Lawandy | |
| 5,840,616 A | 11/1998 | Sakaguchi et al. | |
| 6,007,257 A | 12/1999 | Ogawa et al. | |
| 6,045,269 A | 4/2000 | Watanabe et al. | |
| 6,103,344 A | 8/2000 | Ota et al. | |
| 6,187,653 B1 | 2/2001 | Hui et al. | |
| 6,246,026 B1 | 6/2001 | Vergeest | |
| 6,413,450 B1 | 7/2002 | Mays, Jr. | |
| 6,738,544 B2 | 5/2004 | Culbert et al. | |
| 6,822,190 B2 | 11/2004 | Smithson et al. | |
| 6,826,347 B2 * | 11/2004 | Matsumoto et al. | 385/137 |
| 6,832,124 B2 * | 12/2004 | Engstrand et al. | 700/117 |
| 6,885,806 B2 | 4/2005 | Lo et al. | |
| 2003/0007740 A1 | 1/2003 | Sherrer | |
| 2003/0031409 A1 * | 2/2003 | Bellman et al. | 385/33 |
| 2003/0142922 A1 | 7/2003 | Dallas et al. | |
| 2003/0169962 A1 | 9/2003 | Rajan et al. | |
| 2004/0086255 A1 * | 5/2004 | Botet et al. | 385/137 |

OTHER PUBLICATIONS

Ethel Poire, Analytical Report NST-020802 for Megladon Manufacturing Gp, Aug. 2, 2002.
Ethel poire, Analytical Report NHT-020802 for Megladon Manufacturing Gp, Aug. 2, 2002.
Office Action Having Mail Date Sep. 17, 2008 for U.S. Appl. No. 11/176,492.
U.S. Appl. No. 11/176,492 entitled Multi-Fiber Connector, filed Jul. 7, 2005 and having Robert Mays, Jr. and John M. Culbert listed as inventors.
Office Action Having Mail Date Apr. 14, 2009 for U.S. Appl. No. 11/176,492.

* cited by examiner

*Primary Examiner*—Sarah Song
(74) *Attorney, Agent, or Firm*—Kenneth C. Brooks

(57) ABSTRACT

A system and method for segmenting a plurality of optical fibers to form an arrayed multi-fiber optical connector. In one example embodiment, the present innovations include an optical connector that has a plurality of optical fibers arranged into a two-dimensional array, the optical fibers being segmented by a laser emitting substantially in the infra-red spectrum. The optical fibers are preferably segmented after having been positioned on a substrate that becomes part of the connector.

6 Claims, 10 Drawing Sheets

ECCENTRICITY

ELLIPTICITY

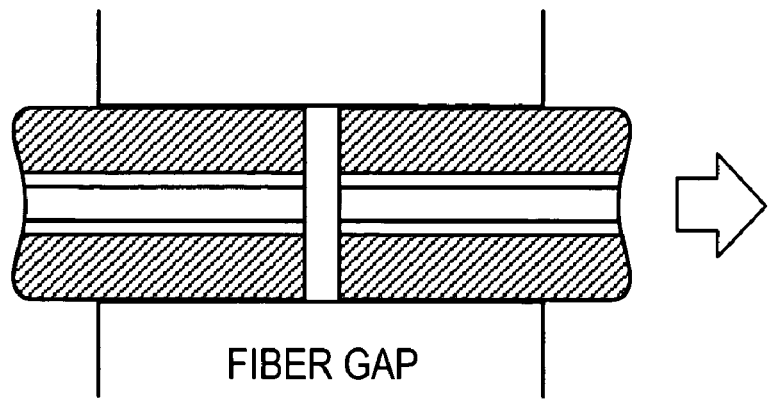
FIG. 2A — FIBER GAP
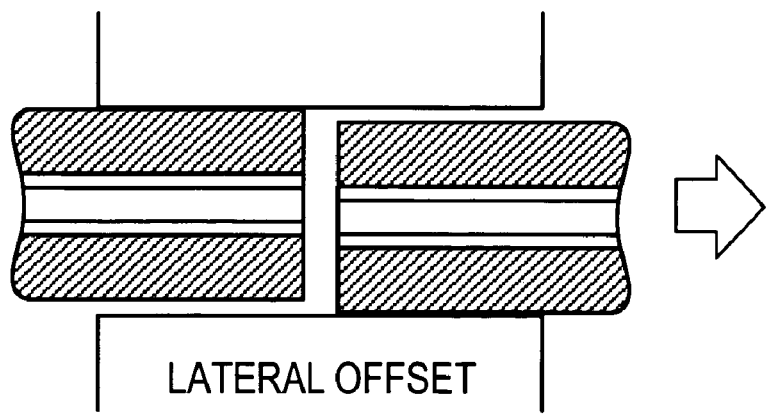
FIG. 2B — LATERAL OFFSET
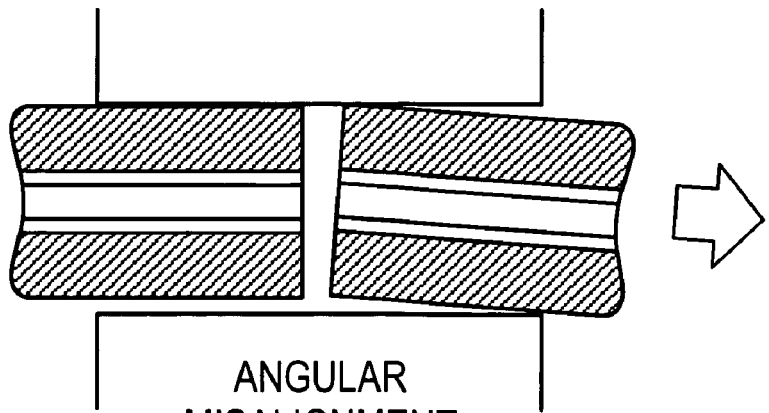
FIG. 2C — ANGULAR MISALIGNMENT

ARRAYED MULTI-FIBER CONNECTOR

FIELD OF THE INVENTION

The present inventions relate generally to coupling of optical fibers, and more specifically to coupling multiple optical fibers using a thermal shaping process.

BACKGROUND AND SUMMARY OF THE INVENTION

Fiber optics are long, thin strands of very pure glass or other materials about the diameter of a human hair used to transmit light. Each strand of optical fiber generally has three components, a core, cladding, and a buffer coating or jacket. The core is a thin glass center of the fiber where the light travels. The cladding is the outer optical material surrounding the core that reflects the light back into the core. The buffer coating is a plastic coating that protects the fiber from damage and moisture. Generally, fiber optic strands can be arranged in bundles called optical cables and used to transmit light signals over long distances.

Fiber optic communication channels are widely used in communication systems around the world. When constructing, maintaining, or repairing a fiber optic network, one or more fibers may need to be connected to other fibers in a communication link. Such interconnections are a critical part of the fiber optic communication system. To mate two or more fibers, optical connectors or "splices" are used. These are devices that place the ends of a transmitting and receiving fiber in aligned proximity so the light from one fiber is inserted into the other fiber.

Connections in a fiber optic system should have low insertion loss. Insertion loss occurs when the optical energy from one fiber is not properly inserted into the receiving fiber, and can result from such things as variations in fibers, misalignment of the fibers, and optical aberrations and irregularities at the ends of the sending and receiving fibers. An ideal interconnection between fibers would require two fibers that are optically and physically identical to one another, without aberrations, held by a connector that perfectly aligns the two fiber cores. Of course, no perfect connector exists, and limitations on their effectiveness are imposed by such considerations as variations in the fibers themselves, tolerances of the connectors or splices, cost of production, and ease of use.

FIGS. 1A-1C show, respectively, three types of fiber-related sources of loss. In FIG. 1A, the core of the fiber is shown offset, which means the cladding is thicker on one side than the other. This misalignment of the core can cause insertion loss, as the fiber to which this example may be joined would probably not have an identical misaligned core. The misalignments between the sending and receiving core allow light to impinge on the cladding instead of the core, causing insertion loss.

FIG. 1B shows an example where the two cores are properly aligned, but are not of the same shape. In this example, the transmitting core does not fully overlap the receiving core. Light in the transmitting core thus impinges on the receiving fiber outside its core, and this results in loss.

FIG. 1C shows another source of loss. In this example, the numerical apertures of the cores are different between the transmitting fiber and the receiving fiber. Thus, the cone of light from a transmitting fiber will extend beyond the core of the receiving fiber, allowing light to escape. Numerical aperture issues are often solved by the addition of microlenses attached to the ends of a fiber or positioned near the end of the fiber to capture the light emitted and focus it on an area within the core of a receiving fiber. However, fabricating and positioning microlenses can be a time consuming and expensive process.

FIGS. 2A-2C show, respectively, three types of mechanically caused loss. FIG. 1A shows a situation in which the two fibers are properly aligned along their axes, but there is a gap between the two fibers. This can cause loss as the diverging light from the transmitting fiber expands to impinge on an area greater than the core of the receiving fiber. The farther the two fiber cores are apart, the greater likelihood of loss.

FIG. 2B shows a situation in which the two fibers are parallel with one another, but are laterally offset. In this case, light emitted from one fiber will only partially transition into the core of the receiving fiber, resulting in loss.

FIG. 2C shows an example of angular misalignment. In this example, the two fiber cores are properly aligned, except that the receiving fiber is set at an angle with respect to the transmitting fiber. Again, this causes some loss as not all the light from the transmitting fiber transitions into the core of the receiving fiber.

These and other insertion loss problems have been addressed, for example, by the addition of microlenses on the ends of fibers. FIG. 3 shows how microlenses work. In this example, the lens from the transmitting fiber captures light from the transmitting fiber and focuses it onto the region of the receiving fiber. In this example, another microlens attached to the end of the receiving fiber captures the light and focuses it onto the core of the receiving fiber. Though microlenses are capable of reducing loss in fiber optic connections, they are difficult to fabricate and properly align and attach to fiber ends. Further, microlenses cannot fully solve the problems, as aberrations on the ends of, for example, a poorly cleaved fiber, may cause light to diverge even outside the width of the lens.

These and other problems with fiber connections are exacerbated when multiple fibers are to be connected in a single interconnect comprising a plurality of fibers. FIG. 4 shows an example of a typical interconnect 400. A ribbon cable 406 of a plurality of fibers aligned side by side (in this example) enters the rear of the interconnect 400. Individual fibers 402 are shown on the connection (front) side of the interconnect 400. In this example, the fibers 402 are shown aligned in a row. Alignment devices 404 are also shown.

Because of the small size of optical fibers, the tolerance in connection technology must be very tight. Materials like plastics may not hold a tolerance and cause misalignment of the fibers. This problem is increased by the fiber related and mechanical related issues described above. Therefore, there is a need in the art for a cheap, efficient way to couple ribbons or cables of fiber optics together.

Arrayed Multi-Fiber Connector

In one embodiment, the present innovations include a plurality of fiber optic channels or fibers aligned in, for example, an array structure (e.g., a two-dimensional array), and inserted into a connector apparatus, either fully or partly assembled. A non-mechanical segmentation process is used to segment the fibers, preferably after assembly into the array.

In preferred embodiments, the non-mechanical segmentation process includes using heat energy (such as that of an IR wavelength laser) to segment the fibers. Preferred processes include the formation of hemispherical integrated lenses from the ends of the fibers. In preferred embodiments, the fibers are placed in either a partly assembled or fully assembled connector apparatus such that the fibers form the array structure, and the ends of the fibers are segmented using the aforementioned process. This leaves the optical fibers with lenses and minimizes the alignment tolerances and the need for adding discrete lenses. Because the fiber ends are also integrated, there are fewer mechanical parts to align which decreases issues in field applications. In preferred embodiments, the array is sealed, e.g., hermetically sealed, to protect it from the elements and other dangers during use.

These and other aspects of the present innovations are described more fully below.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 2A-2C show three different types of loss factor that are related to mechanical alignment.

DETAILED DESCRIPTION OF THE PREFERRED EMBODIMENTS

The numerous innovative teachings of the present application will be described with particular reference to the presently preferred embodiment (by way of example, and not of limitation).

In a preferred embodiment, the present innovations are implemented in the context of an array of optical fibers assembled as part of an optical connector apparatus. The optical fibers are preferably assembled into the arrays as described below, and then lenses are formed on the optical fibers using, for example, an energy source, preferably a laser (however, this order can be varied within the scope of the present innovations). These and other innovative aspects are described below.

Figure 1A:
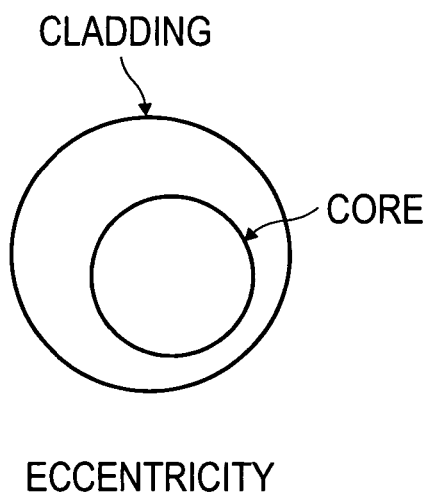
FIGS. 1A-1C show three different types of loss factor that are related to fiber irregularities.
Figure 1B:
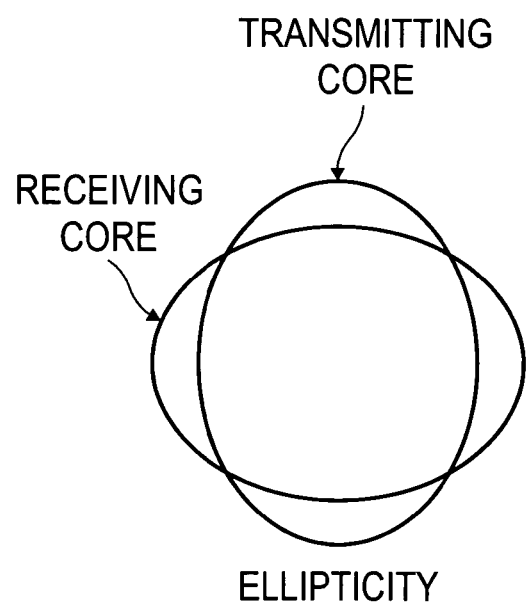
Figure 1C:
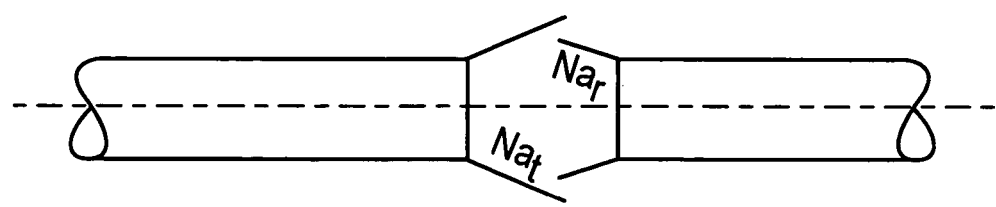
Figure 3:
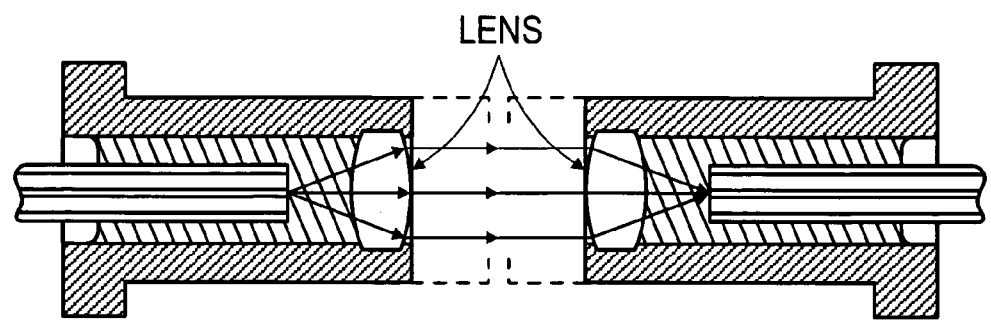
FIG. 3 shows a prior art means for coupling two fibers that attaches separate lenses to fiber ends through mechanical means.
Figure 4:
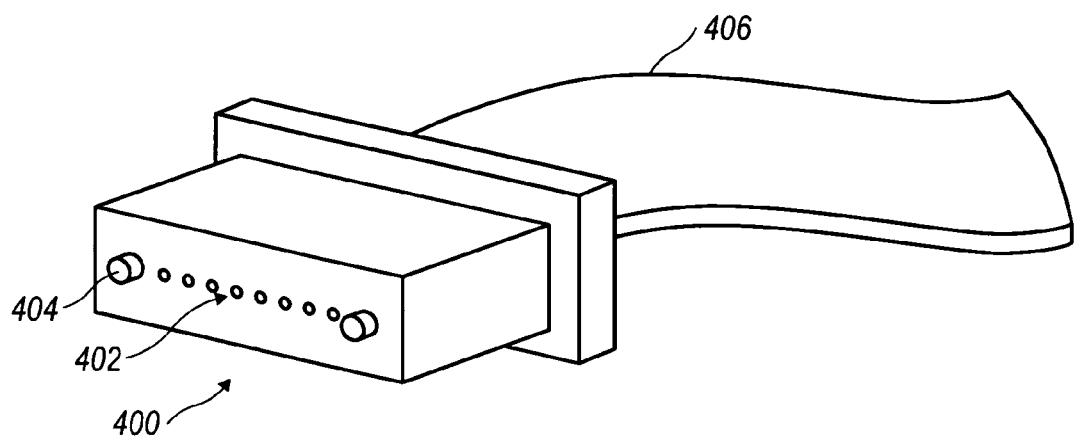
FIG. 4 shows a prior art optical fiber ribbon connector.
Figure 5:
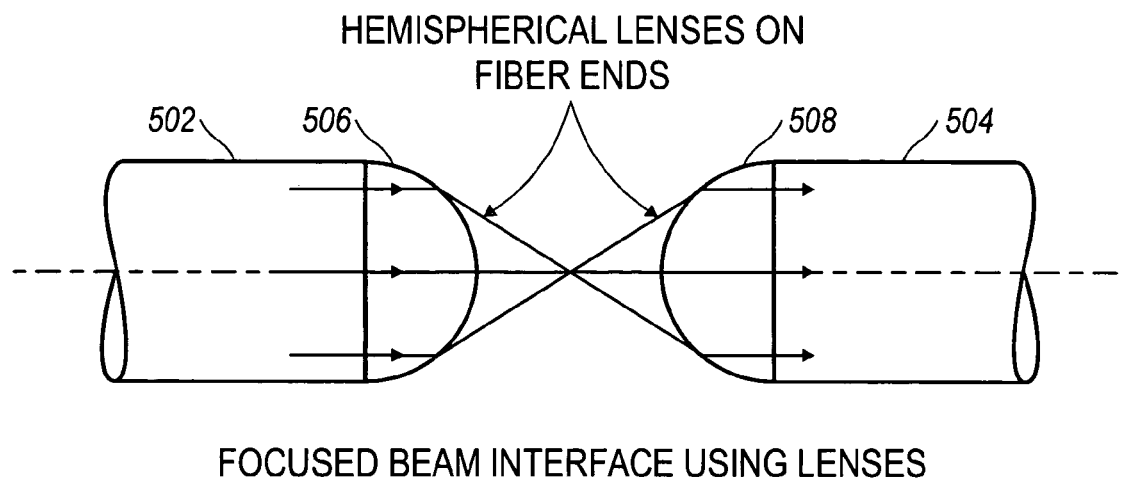
FIG. 5 shows integrated hemispherical lenses consistent with a preferred embodiment of the present innovations.

FIG. 5 shows a pair of fiber ends 502, 504 with integrated hemispherical lenses 506, 508 formed on each of the fiber ends 502, 504. In this example, lens 506 focuses light from fiber 502 into fiber 504 through lens 508. In a preferred embodiment, the lenses are shaped using a method that shapes the optical fibers with various geometries while minimizing unwanted artifacts in the optical path of the fiber core. To that end, the method facilitates control of sag in the region of an optical fiber core that is exposed to a beam of energy, such as laser light or other energy. In one example, the beam is described as including primarily infra-red (IR) wavelengths, or heat energy. Sag is reduced, if not eliminated, by stiffening the optical fiber core to prevent it from bending under the force of gravity. In this manner, the cross sectional area of the optical fiber that is exposed to the beam may be maintained at thermal equilibrium. In an alternative embodiment, thermal equilibrium of the fiber is facilitated by reflecting a portion of the optical beam to impinge on the optical fiber core from a direction that is opposite to the direction of beam emission. To that end, the region of the core to be segmented by the heat energy is spaced apart from the reflective surface. These are only examples of how fiber ends 502, 504 can be fabricated. For further information describing this and other applicable processes, the reader is directed to U.S. Pat. No. 6,413,450 and U.S. Pat. No. 6,738,544, both of which are hereby incorporated by reference.

In a preferred embodiment, the present innovations include an array connector that comprises a plurality of channels or fibers formed into a two-dimensional array ending in a connector that is suitable for joining with a similar connector so that the signal from one set of fibers is inserted into the other set of fibers via the connector. The fiber ends are preferably segmented according to a non-mechanical approach which leaves a fully integrated lens at the end of each fiber of the array. These fibers are positioned on a base surface or substrate that preferably has formed therein v-groove structures sized to isolate the fibers. Another similar set of fibers is also arranged in this way, and the two are combined, for example, but placing them one atop the other to form the two-dimensional array. In one example embodiment, a lid is placed atop the fibers and grooved substrate to hold the fibers in place. In a further example embodiment, the lid includes v-grooves sized to fit the fibers such that the "bottom" surface of the lid and the "top" surface of the substrate come in proximity so that, when they are fabricated with smooth surfaces, molecular forces (such as van der waal forces) are sufficient to hold the lid onto the substrate, isolating the fibers therebetween without the need for any added adhesive measures, such as glue, epoxy, or further mechanical isolation measures. In another innovative aspect, two sets of fibers are stacked to form an array, either with or without a cover plate between. Glue or solder can be used to hold the fibers in place, for example, in embodiments that lack the cover plate.

In another innovative aspect of the present inventions, the non-mechanical segmentation of the fiber ends is performed after insertion into the connector structure. Because the non-mechanical segmentation process does not exert much force on the fibers, their alignment and placement in the connector is not altered during the segmentation process. This is contrasted with mechanical segmentation means known in the art, such as cleaving or shaping, that exert a force on the fibers or that require multiple process steps (such as inserting separate microlenses into the connector for each fiber) inconsistent with use on fibers already inserted into the connector.

Figure 6:
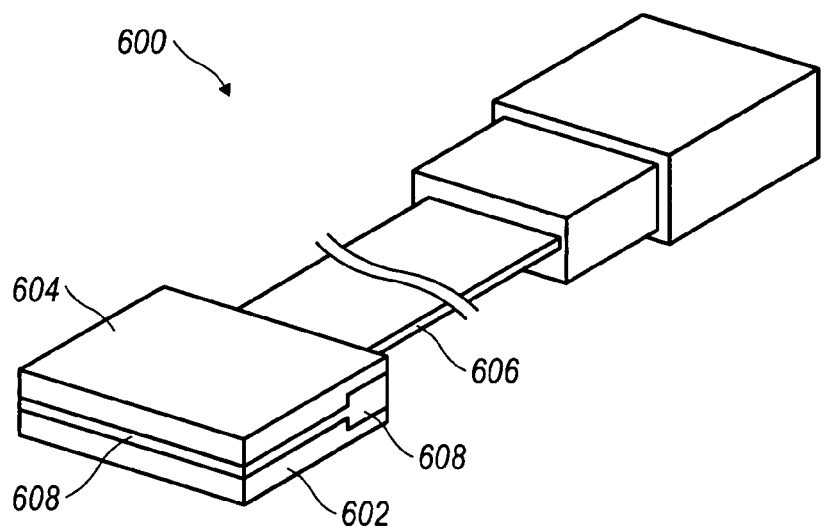
FIG. 6 shows a fiber connector consistent with a preferred embodiment of the present innovations.

FIG. 6 shows one example implementation of an innovative multi-fiber connector consistent with a preferred embodiment of the present inventions. Connector 600 includes a fiber ribbon 606 which preferably includes a plurality of fibers bound together side-by-side into a ribbon. The individual fibers 606 are positioned between a substrate 602 and a lid 604 that, together, hold the fibers 606 in place. Either the substrate 602, the lid 604, or both are fashioned with v-grooves made therein. In this example, an adhesive layer 608 is also used to hold the lid 604 and substrate 602 together.

Figure 7:
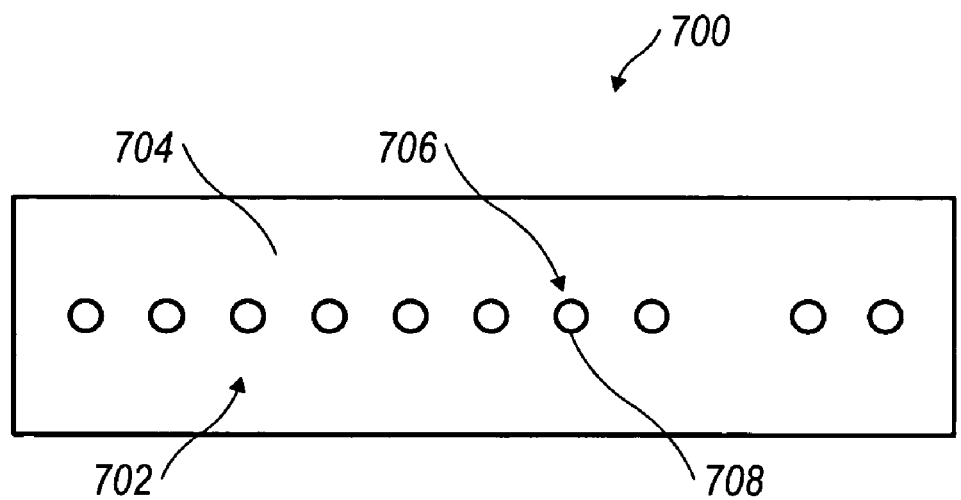
FIG. 7 shows a detail end on view of a fiber connector consistent with a preferred embodiment of the present innovations.

FIG. 7 shows an end view of the connector 700. Substrate 702 has, in this example, v-grooves 706 formed therein, in which fibers 708 are positioned. Lid 704 has, in this example, no v-grooves and is placed atop the fiber array to hold fibers 708 in place. In this example, the lid 704 is made from a glass substance and the substrate 702 is made from silicon and is preferably fabricated through semiconductor processing technology so that tolerances are in the nanoscale regime. For example, in one embodiment, multiple groove widths are preferably produced with accuracies of 0.5 microns or less over distances of a centimeter or more.

Figure 8:
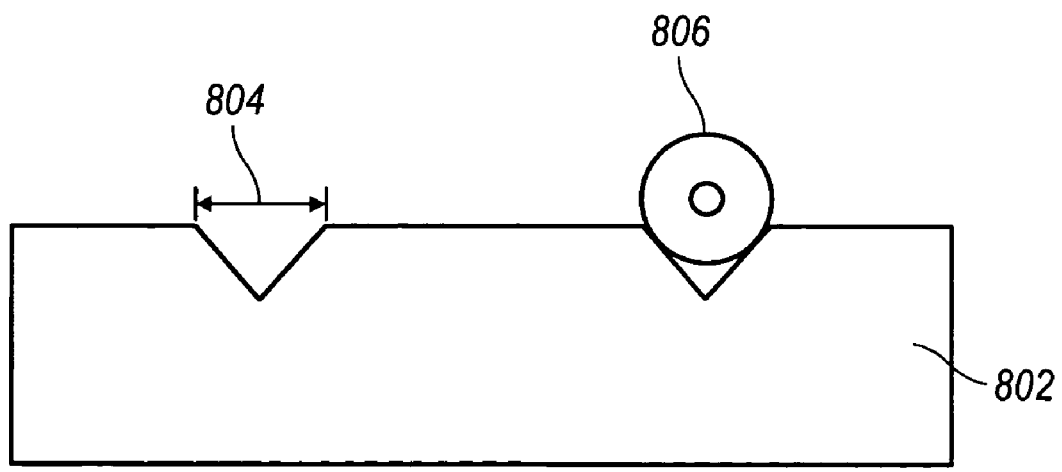
FIG. 8 shows another detail view of a substrate and fiber consistent with a preferred embodiment of the present innovations.

FIG. 8 shows a closer view of a substrate 802 with v-grooves 804 fashioned therein. In this example, the substrate 802 is made from silicon and has v-grooves 804 separated by a sufficient distance that cross talk is reduced or eliminated entirely between fibers 806.

Figure 9A:
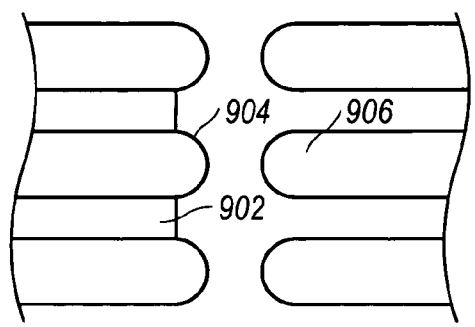
FIGS. 9A and 9B show prepared fibers in v-grooved substrates, consistent with a preferred embodiment of the present innovations.

FIG. 9A shows a close view of fiber ends fashioned with integrated hemispherical lenses positioned in v-grooves of a substrate 902. In this example, a first fiber 904 is positioned with its lensed end in proximity to a second fiber 906 also with a lens fashioned on its end. When two such fibers are positioned in proximity as shown, the lens from the transmitting fiber focuses the light onto the mid section of the lens of the receiving fiber so that insertion loss is minimized.

Figure 9B:
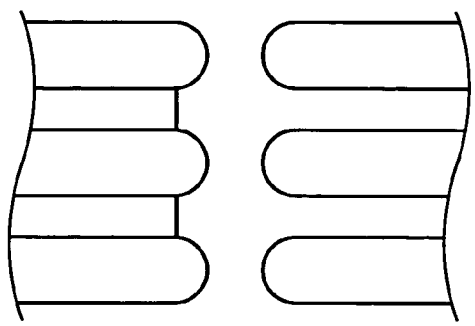

FIG. 9B shows a similar view as FIG. 9A except that three such fibers, forming part of an array, are shown.

Figure 10:
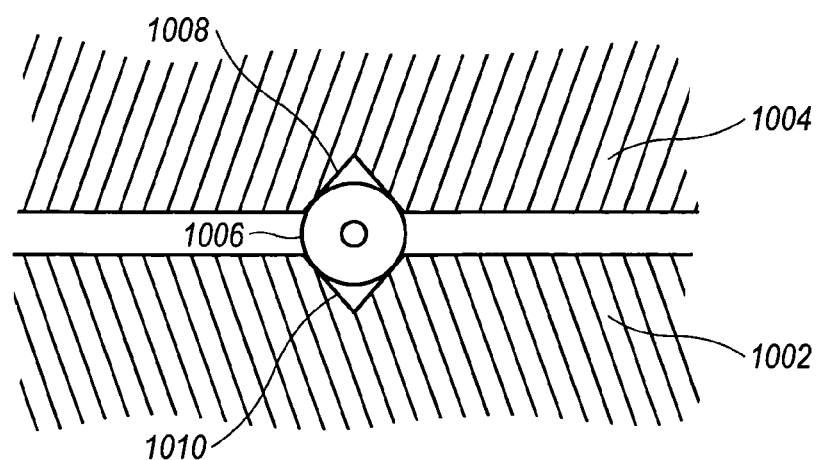
FIG. 10 shows an end view of a substrate, fiber, and grooved lid consistent with a preferred embodiment of the present innovations.

FIG. 10 shows yet another embodiment of the present innovations. In this example, the lid 1004 and substrate 1002 both include v-grooves 1008, 1010 fabricated therein such that fiber 1006 is positioned between an upper v-groove 1008 and a lower v-groove 1010. In preferred embodiments, the fibers 1006 are stripped of their jacket and other materials, leaving only the cladding and core of the fiber intact. Other methods of preparing the fiber are also consistent with the innovations of the present application.

Figure 11A:
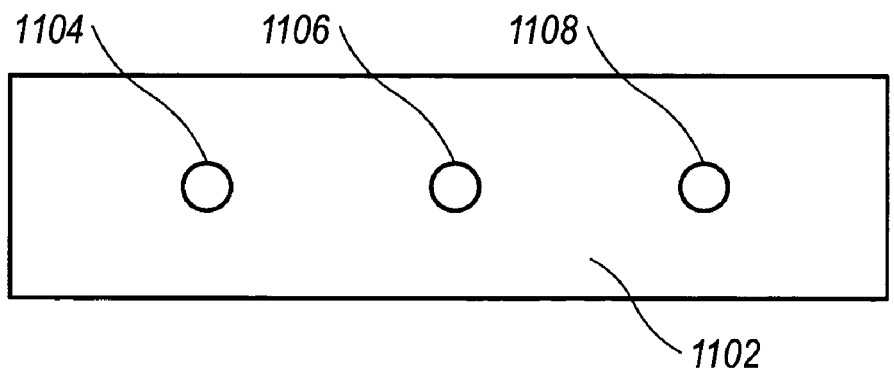
FIGS. 11A-11C show various degrees of crosstalk between fibers of a connector.
Figure 11B:
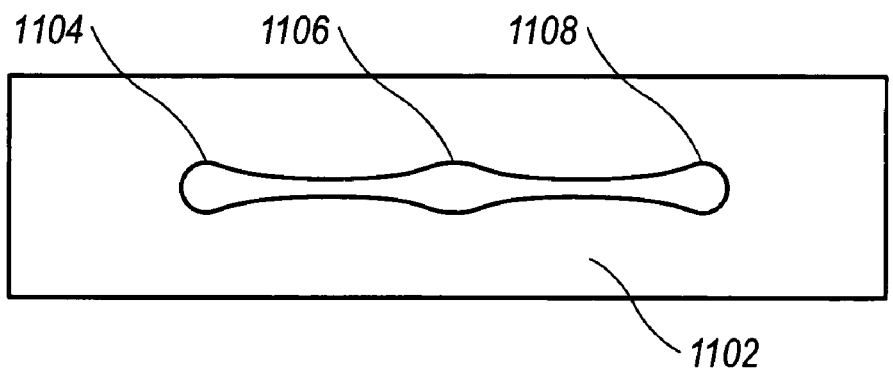
Figure 11C:
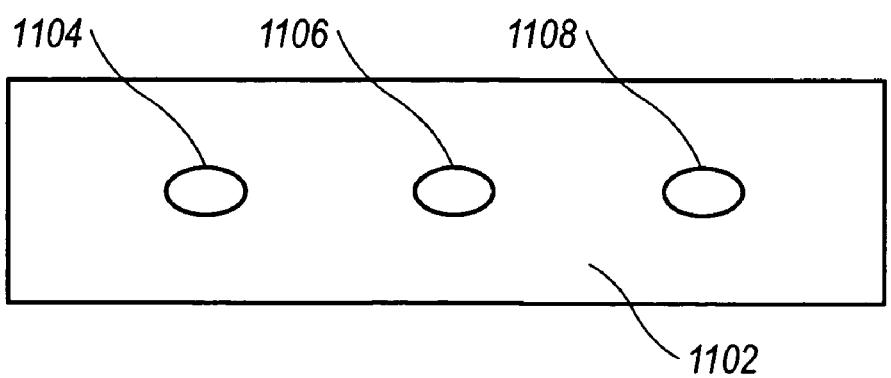

One advantage of the present innovations, including the use of non-mechanical segmentation of the fibers that leaves an integral, hemispherical lens on the end of the fiber, is the reduction in cross talk that occurs between the fibers. As data transmission requirements grow to the point that ever larger amounts of data are moved by fiber optic cables, there is a pressure to miniaturize the transmission channels so that more channels can be implemented. As the fibers and related equipment, such as connectors, are miniaturized, the fibers are moved closer and closer together. Due to effects such as evanescent coupling, cross talk can occur between different channels or fibers. Proper placement and alignment of the fibers can help reduce this cross talk, and the integral lenses described herein provide an easy to implement means to further reduce cross talk. FIGS. 11A-11C show examples of how cross talk appears in closely spaced fibers. In FIG. 11A, a perfect signal without cross talk is depicted. Connector 1102 contains three fibers that transmit signals 1104, 1106, 1108. In this example, which shows an ideal situation, the signals are perfectly circular in profile, meaning they match the fiber core and do not attempt to couple into the nearby fibers.

FIG. 11B shows a more realistic situation where signals 1104, 1106, and 1108 include much crosstalk, so much that the three separate signals are difficult to distinguish. This situation is obviously not ideal, as such signals would need improvement, either by reconstructing the connector to provide more room between fibers, or by electronic means to eliminate the confusion between the signals, for example, by implementing error control coding for that specific purpose.

FIG. 11C shows an example level of cross talk that is more acceptable, and which is achievable by implementing the present innovations. Signals 1104, 1106, 1108 do show some signs of expanding beyond the fibers, but do not impinge on one another. This example thus shows a much reduced level of cross talk than FIG. 11B.

Figure 12:
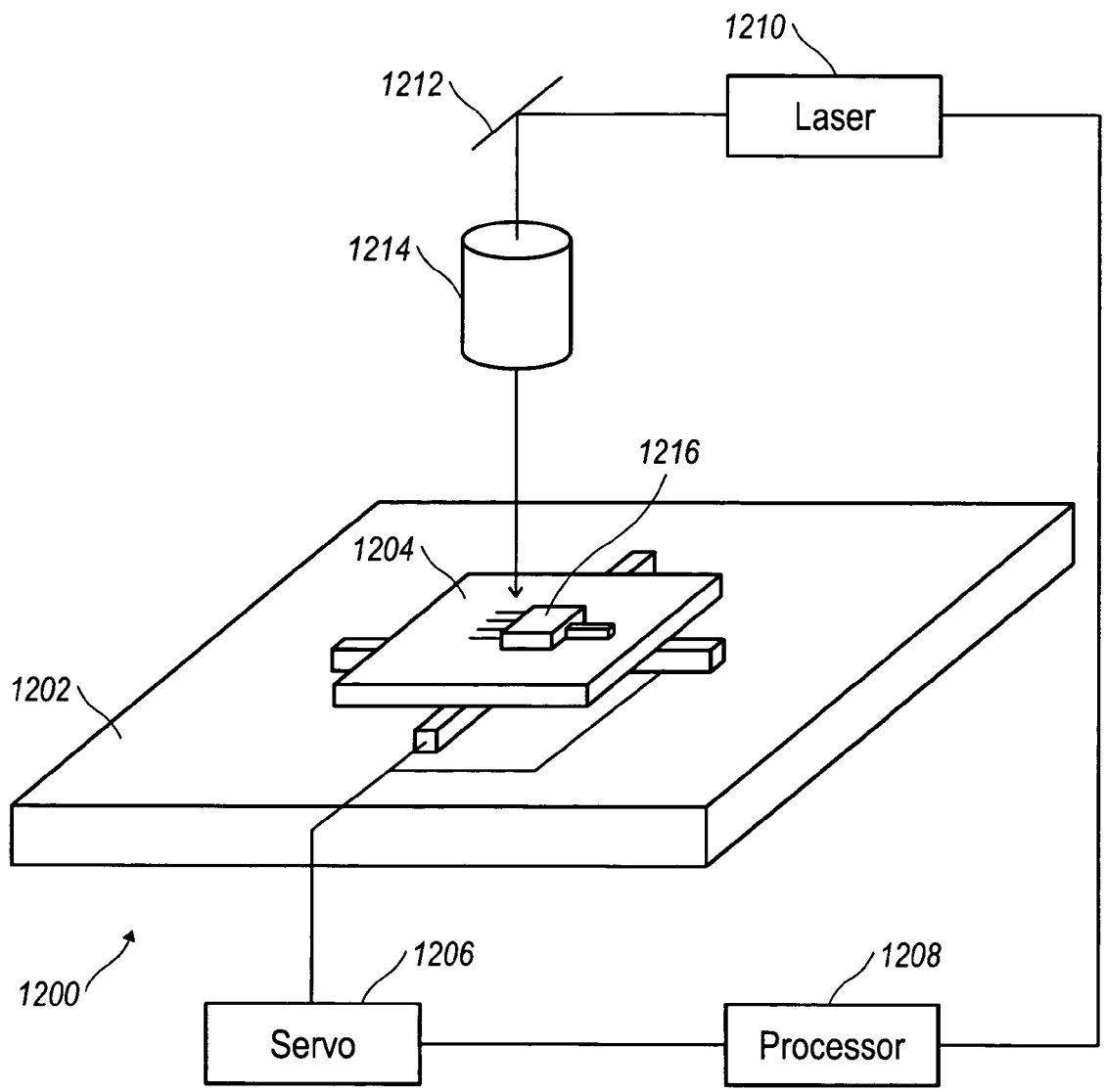
FIG. 12 shows an apparatus for segmenting a plurality of fibers consistent with implementing a preferred embodiment of the present innovations.

FIG. 12 shows an apparatus that is consistent with implementing a preferred embodiment of the present innovations. Apparatus 1200 includes a table 1202 on which is placed a platform 1204 that is movable by servo mechanism 1206. The servo is preferably controlled by a computer such as processor 1208. Processor, in this example embodiment, also controls laser 1210. Laser is positioned to send a beam of preferably IR wavelength electromagnetic energy (though other wavelengths are possible and consistent with the present innovations) to strike mirror 1212 and pass through focusing lens or lens system 1214 to ultimately impinge upon a plurality of fibers extending from part or all of connector apparatus 1216. In preferred embodiments, laser 1210 is stationary and servo 1206 moves the platform 1204 such that the laser passes through all fibers of the plurality that are part of connector 1216. It is important to note that, in this preferred embodiment, the fibers of the connector 1216 have been stripped of their jackets and reduced preferably to only cladding and core, and are positioned within v-grooves of the base substrate of the connector. Alternately, the connector can have the lid attached as well, so that the fibers are even more isolated before segmentation begins. The segmentation process preferably leaves integrated hemispherical lenses on the fiber ends, as described above.

Of course, other systems capable of using the non-mechanical segmentation method described herein to segment a plurality of fibers placed within v-groove or upon other types of substrates as preparation for creation of an optical connector are consistent with the innovations of the present inventions. The system described in FIG. 12 is not intended to limit the scope of apparatus capable of implementing the present innovations, and is presented here only as one possible example.

Figure 13:
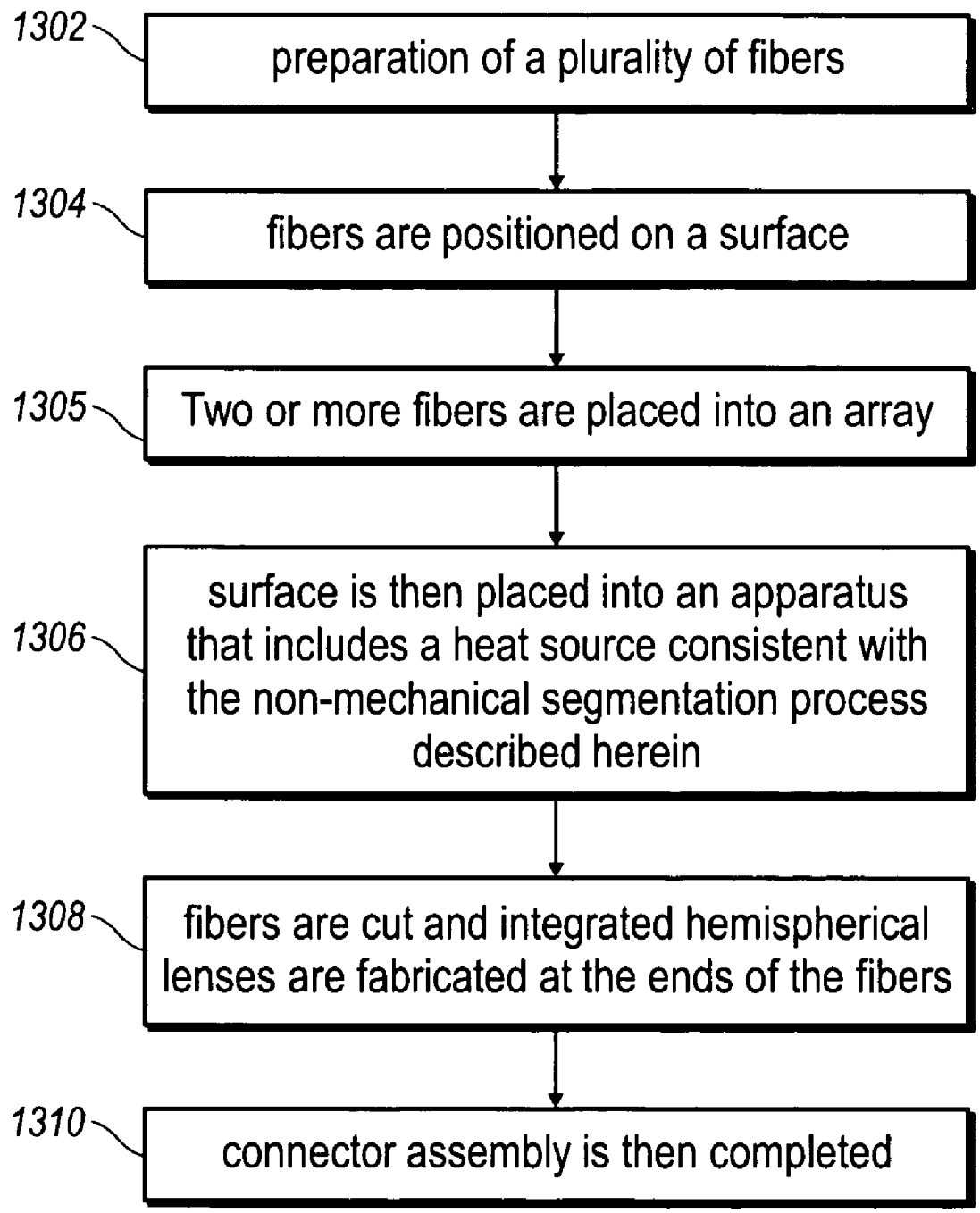
FIG. 13 shows a flowchart of process steps consistent with implementing a preferred embodiment of the present innovations.

FIG. 13 shows a flowchart depicting process steps for implementing one example embodiment of the present innovations. In this example, the process begins with preparation of a plurality of fibers (step 1302), such as by stripping the jacket and other material to leave only the core and cladding of the fibers. Next, two or more sets of fibers are positioned on a surface (step 1304), such as a silicon substrate prepared with v-grooves wherein the fibers are pulled into the grooves. They may be affixed to the surface by means of glue, molecular forces, or by applying a cover plate to hold the fibers in place. Next, the two or more sets of fibers are placed into an array arrangement, such as by stacking them one atop the other (step 1305). This can be achieved, for example, by flipping an array and stacking it atop another array, and securing them together. The array is then placed into an apparatus that includes a heat source consistent with the non-mechanical segmentation process described herein (step 1306), such as on the platform 1204 of apparatus 1200 equipped with a laser emitting at substantially IR frequencies. Next, the arrayed plurality fibers are cut and integrated hemispherical lenses are fabricated at the ends of the fibers (step 1308). The connector assembly is then completed (step 1310), for example, by adding a lid and other apparatus to the substrate and fibers to complete the connector. Alternately, the lid can be added to the assembly during a previous step, such as prior to segmentation of the fibers. The fibers can also be, in less preferred embodiments, individually treated to form lenses thereon before being arranged into the arrays or being put on the substrates. It is noted that the fibers are preferably cut while in a partial or complete connector assembly. The use of the non-mechanical segmentation permits this segmentation during partial connector assembly because there is little or no force exerted on the fibers by the segmentation process, as opposed to other segmentation means, such as mechanical segmentation processes that include cleaving, polishing, or other physical manipulation of the fibers which has a tendency to exert a force on the fibers and thereby move them from proper alignment. As described above, such movement in the fibers can exacerbate problems such as cross talk, insertion loss, and other common issues in fiber connectors.

Figure 14:
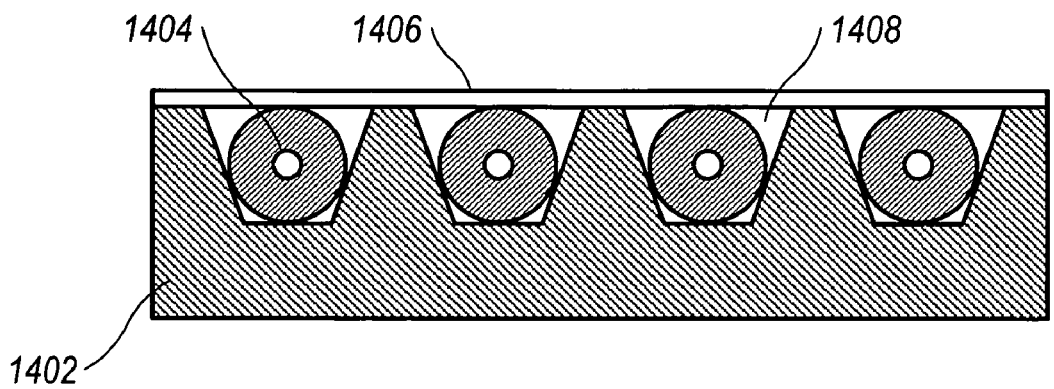
FIG. 14 shows a partially assembled fiber connector array, consistent with implementing a preferred embodiment of the present innovations.

FIG. 14 shows an example of a partially assembled array of optical fibers consistent with preferred embodiments of the present innovations. In this example, a substrate 1402 has been formed with grooves 1408. These grooves are preferably v-grooves made using semiconductor processing technology, but can also be formed in other ways without deviating from the present innovations. Fibers 1404 are placed in the grooves 1408 and are either fixed by some means (such as glue, epoxy, soldering, etc.) or are held in place by molecular forces (in some embodiments) or, alternately, they can be held in place by a cover plate 1406. One or more of these can be implemented, such as both gluing the fibers and adding a cover plate. This example shows a first half of a two-layer array of optical fibers in a connector.

Figure 15:
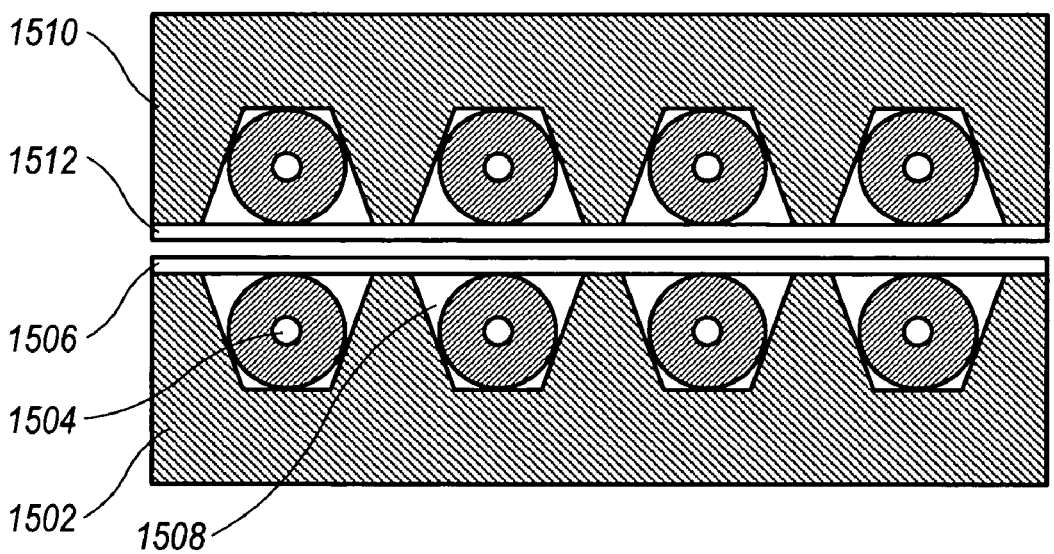
FIG. 15 shows an array consistent with a preferred embodiment of the present innovations.

FIG. 15 shows an example with a second layer in a two-layer array of optical fibers in a connector. In this example, a first substrate 1502 has grooves 1508 formed therein with fibers 1504 placed in the grooves, as described above. A cover plate 1506 is used to cover the fibers in the grooves and hold them in place.

A second substrate 1510 is also prepared in a similar fashion, including fibers in grooves with a second cover plate 1512 to hold the fibers in place. This second substrate 1510 is, in preferred embodiments, inverted and placed atop the first substrate 1502 so that the two sets of fibers are arrayed in a two-dimensional array, as shown. This stacking can continue, for any nxm array of fibers to form an arrayed multi-fiber connector. As described above, the fibers are then preferably cut using an energy source (such as a laser) that forms integrated lenses on each of the fibers without mechanical cleaving or polishing steps.

Figure 16:
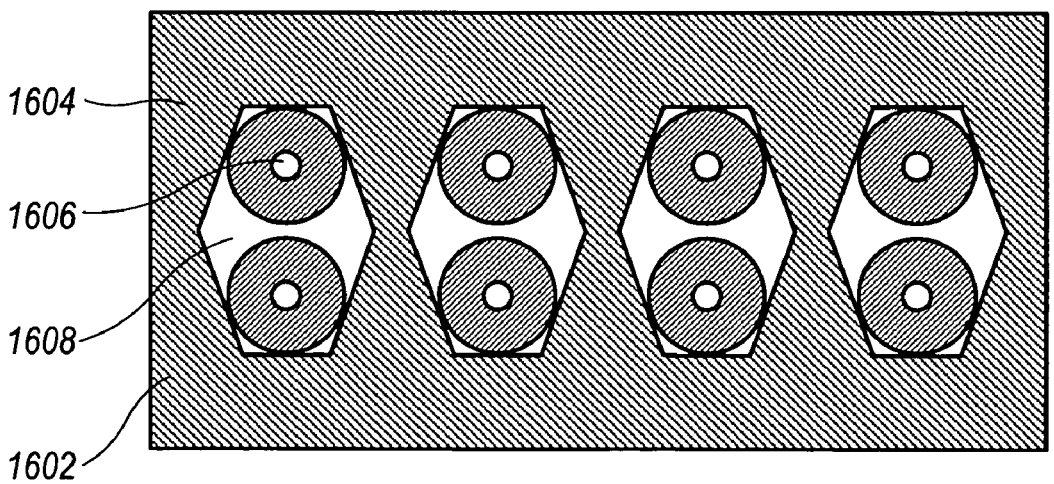
FIG. 16 shows an array consistent with a preferred embodiment of the present innovations.

FIG. 16 shows another example embodiment. In this example, the fibers 1606 are placed in first substrate 1602 and second substrate 1604 as shown, where the substrates each have grooves 1608 formed therein to receive the fibers. It is noted that in this embodiment, no cover plates are used, and the fibers are preferably held in place by soldering or glue or other means. The two substrates are held together by soldering, glue, molecular forces (for example, with highly smooth surfaces) or by other means. As mentioned above, these fibers are preferably cut and lenses formed thereon after they are inserted into the substrates, though the fibers can be segmented prior to insertion as well.

In preferred embodiments, the two or more substrates stacked in this way to form arrayed multi-fiber connectors are housed in plastic or other material and equipped with the necessary connecting devices to create optical connectors that will join one set of fibers to another set of fibers so that light from one set is inserted into the other set. Thus, the present innovations, in the various embodiments, provides for arrayed multi-fiber connectors where the arrays are two-dimensional arrays. In preferred embodiments, the connectors are hermetically (or otherwise) sealed, for example, by housing them in sealed environments or by swamping the assembly in some sealant such as an epoxy.

According to a disclosed class of innovative embodiments, there is provided: An optical fiber connector, comprising: a two-dimensional array of optical fibers positioned on one or more substrates, wherein the optical fibers are exposed to a source of energy to thereby segment the optical fibers and form finished ends on the fibers.

According to a disclosed class of innovative embodiments, there is provided: A method of segmenting a plurality of optical fibers, comprising the steps of: positioning a first plurality of optical fibers on a first substrate, each fiber being aligned within a groove of the first substrate; positioning a second plurality of optical fibers on a second substrate, each fiber being aligned within a groove of the second substrate; placing the first and second substrates together to form a two-dimensional array of optical fibers; exposing the first and second pluralities of fibers to a source of energy to thereby segment the pluralities of fibers and form finished ends on the pluralities of fibers.

According to a disclosed class of innovative embodiments, there is provided: An optical connector, comprising: a first substrate having a first plurality of optical fibers positioned thereon; a second substrate having a second plurality of optical fibers positioned thereon; wherein the first substrate and second substrate are positioned such that the first and second pluralities of optical fibers form a two-dimensional array of optical fibers; and wherein the first and second pluralities of optical fibers are exposed to an energy source to thereby segment and form finished ends on the pluralities of optical fibers.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, though particular materials are described in the examples presented, such as silicon for the substrate, other materials can be used as well, and the examples given are not intended to suggest limitations to the present innovations.

Similarly, though specific examples have been given including using laser light for segmentation, other means in existence or not yet developed to focus non-mechanical energy on the plurality of fibers sufficient to segment them and fabricate the integral hemispherical lens are also consistent with the present innovations.

Further, though v-grooves are described as being formed on the substrate, other types of depressions or grooves, including rounded or squared or any other shape, can be implemented within the scope of the present innovations.

Other approaches implementing the present innovations include the "soft seal" or solder approach, and the nano-tube or hollow core approach. Regarding the soft seal approach, both the groove or rut and the fiber are coated with either epoxy or a low temperature solder. The fiber is then inserted into the rut. If a low temperature solder compound is used, the whole assembly is preferably brought to a low temperature, such as 90 Celsius or less, for a few hours until the epoxy cures. The adhesive or solder is preferably vapor deposited on both the fiber and the groove structures in order to maintain the extremely tight tolerances (in the sub-micron range, as the gaps between fibers and the walls of the grooves are preferably less than a micron). This means that preferably the epoxy or solder thickness should be only one or a few molecules in depth. Though this is possible, the masking steps and deposition controls are costly and dramatically increase the overall cost effectiveness of the approach. Further, the epoxy or solder materials used must be able to withstand the large temperature increase caused by the laser as it cuts the fiber and forms the lens on the end. Thus, care must be taken to match the thermal expansion and heat diffusion differences of the fiber, cladding, substrate, etc. Adhesives consistent with this alternative methodology can vary, including but not limited to the relatively weak glues such as those used in sticky notes, or others which can be readily deposited in monolayers of only 1-2 molecules thickness, and which hold up well if exposed to brief pulses of energy, i.e., those having good elasticity properties.

Regarding the nano-tube or hollow core approaches, real-world or practical structures of this nature, e.g., those with tight enough tolerances, are preferably either formed as nano-vias using a laser (which requires tremendous laser power because of the substrate lengths involved) or fabricated using thermodynamic self-assembly processes such as those involved with bucky-balls or molecular medicine encapsulants. However, these processes are less preferred because of expense and relative difficulty.

Additional general background, which helps to show variations and implementations, may be found in the following publications, all of which are hereby incorporated by reference: *Designer's Guide to Fiber Optics*, AMP Inc., (1981); *Fiber Optics*, CRC Press Inc. (1984); *Effects of Pulsed Laser Irradiation On Thermal Oxides of Silicon*, D. Crosthwait, R. Shah, G. Brown and R. Mays, TX Inc. (SRDL) (1980); *Characterization of Thermal Oxides of Laser Annealed Silicon*, R. Shah, R. Mays, D. Croswait, Texas Instruments Inc (SRDL), (1981) (The previous two papers presented to the Materials research Society, Boston, Mass. in 1980 and 1981.); Laser Focus World, May, 2002; Analytical Reports NST-020715 and NST-020802 for Megladon, MicroPhotonics Inc., Ethel Poire, July 2002.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method of segmenting a plurality of optical fibers and forming an optical connector, comprising the steps of:
   positioning a first plurality of optical fibers on a first substrate, each fiber being aligned within a groove of the first substrate;
   positioning a second plurality of optical fibers on a second substrate, each fiber being aligned within a groove of the second substrate;
   placing the first and second substrate together to form a two-dimensional array of optical fibers;
   thereafter, exposing the first and second pluralities of fibers to a source of energy to thereby segment the pluralities of fibers and form finished ends on the pluralities of fibers; and
   forming an optical connector using the first and second substrates as parts of the optical connector.

2. The method of claim 1, wherein the optical fibers are segmented in a process that forms integrated hemispherical lenses on each fiber.

3. The method of claim 1, wherein the first and second substrates are separated from one another by at least one layer of material.

4. The method of claim 1, wherein the energy is primarily infra-red energy from a laser source.

5. The method of claim 1, wherein the energy is thermal energy.

6. The method of claim 1, wherein the finished ends of the plurality of fibers comprise a hemispherical integrated lens on each of the plurality of fibers.

* * * * *